(12) United States Patent
Miller et al.

(10) Patent No.: US 7,708,645 B2
(45) Date of Patent: May 4, 2010

(54) GREASE SHIELD SEALING SYSTEM FOR DIRECT TORQUE FLOW CONSTANT VELOCITY JOINT

(75) Inventors: Michael Miller, White Lake, MI (US); Eric LaMothe, Clinton Township, MI (US); Robyn Tsukayama, Southfield, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 10 days.

(21) Appl. No.: 11/355,051

(22) Filed: Feb. 15, 2006

(65) Prior Publication Data

US 2007/0191122 A1   Aug. 16, 2007

(51) Int. Cl.
F16D 3/84   (2006.01)
(52) U.S. Cl. ...................... 464/173; 464/906
(58) Field of Classification Search ........... 464/170, 464/171, 173, 177, 905, 906, 140–146; 277/635
See application file for complete search history.

(56) References Cited

U.S. PATENT DOCUMENTS

| | | | | | |
|---|---|---|---|---|---|
| 1,022,909 | A | * | 4/1912 | Whitney | ............ 464/143 |
| 1,356,899 | A | * | 10/1920 | Baits | ............ 464/170 X |
| 1,394,749 | A | * | 10/1921 | Lowndes | ............ 464/171 X |
| 1,967,842 | A | * | 7/1934 | Raviola et al. | ............ 464/173 |
| 3,204,427 | A | * | 9/1965 | Dunn | |
| 3,906,747 | A | * | 9/1975 | Orain | ............ 464/905 |
| 4,610,643 | A | * | 9/1986 | Krude | ............ 464/143 |
| 6,368,224 | B1 | * | 4/2002 | Knodle et al. | ............ 464/170 X |
| 6,439,795 | B1 | * | 8/2002 | Lavery et al. | ............ 464/173 X |
| 6,550,350 | B2 | * | 4/2003 | Martin | ............ 277/635 X |
| 6,579,187 | B2 | * | 6/2003 | Ramey | ............ 464/145 X |
| 7,040,992 | B2 | * | 5/2006 | Dine et al. | ............ 464/170 |
| 2004/0162147 | A1 | * | 8/2004 | Masuda | |

OTHER PUBLICATIONS

Universal Joint and Driveshaft Design Manual, AE-7, Society of Automotive Engineers, Warrendale, PA, pp. 10 & 151, TJ1079.S62 1979.*

* cited by examiner

*Primary Examiner*—Greg Binda
(74) *Attorney, Agent, or Firm*—Jennifer M. Brumbaugh; Mick A. Nylander

(57) ABSTRACT

A shield for sealing a joint includes a first end, a second end and an annular shell. The first end is adapted for axial retention on an outer joint part, where the outer joint part is rotationally coupled to an inner joint part. The second end is adapted for abutting contact with a semi-spherical portion of the inner joint part. The annular shell extends between the first end and the second end thereby providing a seal for the joint. Also provided is a grease shield sealing system for a direct torque flow constant velocity joint.

12 Claims, 2 Drawing Sheets

GREASE SHIELD SEALING SYSTEM FOR DIRECT TORQUE FLOW CONSTANT VELOCITY JOINT

TECHNICAL FIELD

The present invention relates generally to motor vehicle shaft joints, and more particularly concerns a grease shield sealing system for constant velocity joints, particularly suited for high-speed applications.

BACKGROUND

Constant velocity joints (CVJ) connecting shafts to drive units are common components in automotive vehicles. The drive unit typically has an output shaft or an input shaft for receiving the joint. Typically, the drive unit is an axle, transfer case, transmission, power take-off unit or other torque device, all of which are common components in automotive vehicles. Typically, one or more joints are assembled to the shaft to form a propeller or drive shaft assembly. It is the propeller shaft assembly which is connected, for instance, at one end to an output shaft of a transmission and, at the other end, to an input shaft of a differential. The shaft is solid or tubular with ends adapted to attach the shaft to an inner race of the joint thereby allowing an outer race connection to a drive unit. The inner race of the joint is typically press-fit, splined, or pinned to the shaft making the outer race of the joint available to be bolted or press-fit to a hub connector, flange or stubshaft of the particular drive unit. At the other end of the propeller shaft, the same typical or traditional connection is made to a second drive unit when connecting the shaft between the two drive units. Connecting the shaft to a drive unit via the constant velocity joint in this manner is considered a traditional connection. A Direct Torque Flow (DTF) connection is a newer connection style that has advantages and improvements over a traditional connection. The constant velocity joint, whether in a traditional or DTF connection, requires the internal cavity to be sealed from the external environment in which it is utilized, for example by an internal radial diaphragm (IRD) boot or convoluted boot assembly.

The internal radial diaphragm (IRD) boot or J-boot provides a seal to prevent joint contamination or lubricant leakage. The IRD boot requires a first end of the boot to be crimped upon a cover that extends away from an outer joint part. The crimped connection may lead to leaks or other contamination of the joint due to an inadequate seal between the first end of the boot and the cover. Moreover, the internal joint may be compromised should the cover fail or the cover connection become compromised where it attaches to the outer joint part. In operation, the IRD boot is also sensitive to increased internal joint pressures, which may lead to bulging, kinking or binding of the boot.

The IRD boot offers a smaller internal cross sectional area which reduces grease fill in the joint and allows for high speed rotation typically needed for torque transfer applications. However, the IRD boot requires an extension cover extending from the outer joint part. This extension cover may interfere with the angular rotation of a CVJ forming a DTF connection. Also, the extension cover may interfere with the optimization of various parameters desired in a DTF connection, such as the parameters described in PCT Publication No.: WO 2007/044003 incorporated by reference herein. One solution to the IRD boot for sealing a DTF joint is to use a membrane seal. A membrane seal, however, is also sensitive to increased internal joint pressures that may lead to bulging, kinking, binding or tearing of the boot. Also, the membrane seal may limit the allowable angular rotation of a DTF joint.

It is desirable to have a grease shield sealing system for a DTF CVJ that overcomes the limitations indicated above. It is also desirable to provide a sealing system suitable for high-speed constant velocity joint applications.

SUMMARY OF THE INVENTION

Accordingly, the present invention provides a grease shield sealing system for a DTF CVJ. The grease shield sealing system may minimize sensitivity to increased internal joint pressure by providing a semi-rigid sealing shield or primary internal barrier thereby eliminating bulging, kinking or binding issues associated with traditional boots. In addition, the grease shield sealing system provides for a reduction of lubricant fill in the DTF CVJ, and provides for the use of alternate materials without regard to material compatibility. It also permits increased operating temperatures as compared to traditional boots, and provides improved angular movement of a DTF CVJ. Moreover, the grease shield sealing system reduces the chance of damage caused by debris.

A shield for sealing a joint includes a first end, a second end and an annular shell. The first end is adapted for axial retention on an outer joint part, wherein the outer joint part is rotationally coupled to an inner joint part. The second end is adapted for abutting contact with a semi-spherical portion of the inner joint part. The annular shell extends between the first end and the second end thereby providing a seal for the joint.

The present invention also provides a grease shield sealing system for a direct torque flow constant velocity joint. The present invention will be best understood by reference to the following detailed description and taken in conjunction with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION

In the following description, various operating parameters and components are described for one or more constructed embodiments. These specific parameters and components are included as examples and are not meant to be limiting.

While the invention is described with respect to a grease shield sealing system for a DTF CVJ for use in a vehicle, the following apparatus is capable of being adapted for various sealing purposes including automotive vehicle drive axles, motor systems that use a propeller shaft, or other vehicles and non-vehicle applications which require propeller shaft assemblies for torque transmission.

Figure 1:
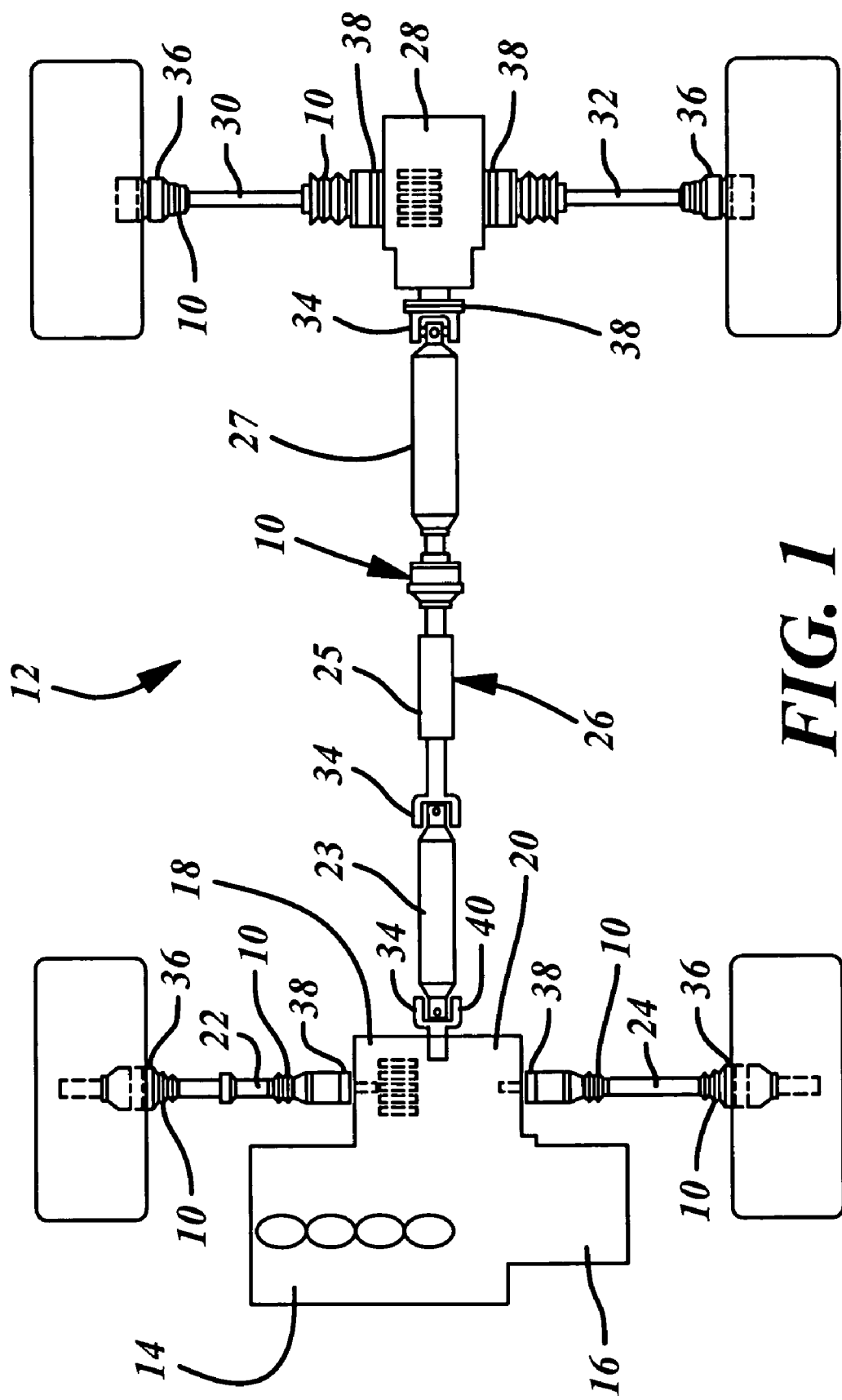
FIG. 1 shows a plan view of an exemplary drive system for a typical four-wheel drive automobile wherein the present invention may be used to advantage.

An exemplary drive system 12 for a typical four-wheel drive automobile is shown in FIG. 1. While a four-wheel drive system is shown and described, the concepts here presented could apply to a single drive unit system or multiple drive unit system, including rear wheel drive only vehicles, front wheel drive only vehicles, all wheel drive vehicles, and four wheel drive vehicles. In this example, the drive system 12 includes an engine 14 that is connected to a transmission 16 and a power take-off unit 18. A front differential 20 has a right hand side half shaft 22 and left hand side half shaft 24, each of which are connected to a wheel and deliver power to the wheels. On both ends of the right hand side half shaft 22 and left hand side half shaft 24 are constant velocity joints 10. A propeller shaft 26 connects the front differential 20 to a rear differential 28 wherein the rear differential 28 includes a rear right hand side shaft 30 and a rear left hand side shaft 32, each of which ends with a wheel on one end thereof. Constant velocity joints 10 are located on both ends of the half shafts 30, 32 that connect to the wheels and the rear differential 28. The propeller shaft 26, shown in FIG. 1, is a three-piece propeller shaft that includes a plurality of Cardan joints 34 and one high-speed constant velocity joint 10. The propeller shaft 26 includes interconnecting shafts 23, 25, 27. The constant velocity joints 10 transmit power to the wheels through the propeller shaft 26 even if the wheels or the propeller shaft 26 have changed angles due to steering, raising, or lowering of the suspension of the vehicle. The constant velocity joints 10 may be any of the standard types known, such as a plunging tripod, a cross groove joint, a fixed ball joint, a fixed tripod joint, or a double offset joint, all of which are commonly known terms in the art for different varieties of constant velocity joints 10. The constant velocity joints 10 allow for transmission of constant velocities at angles typically encountered in every day driving of automotive vehicles in both the half shafts, interconnecting shafts and propeller shafts of these vehicles. Optionally, each Cardan joint 34 may be replaced with any other suitable type of joint, including constant velocity joint types. A grease shield sealing system for a direct torque flow constant velocity joint of the present invention may be utilized with any of the above-mentioned joints.

The shafts 22, 23, 24, 25, 27, 30, 32 may be solid or tubular with ends adapted to attach each shaft to an inner race or an outer race of a joint in accordance with a traditional connection, thereby allowing the outer race or inner race to be connected to a hub connector 36, a flange 38 or stubshaft 40 of each drive unit, as appropriate, for the particular application. Thus, any of the traditional connections identified in FIG. 1 at 10 or 34 that connect to a drive unit may be a direct torque flow constant velocity joint (DTF CVJ) having a grease shield sealing system in accordance with a first embodiment (FIG. 2), or a second embodiment (FIG. 3) of the present invention.

Figure 2:
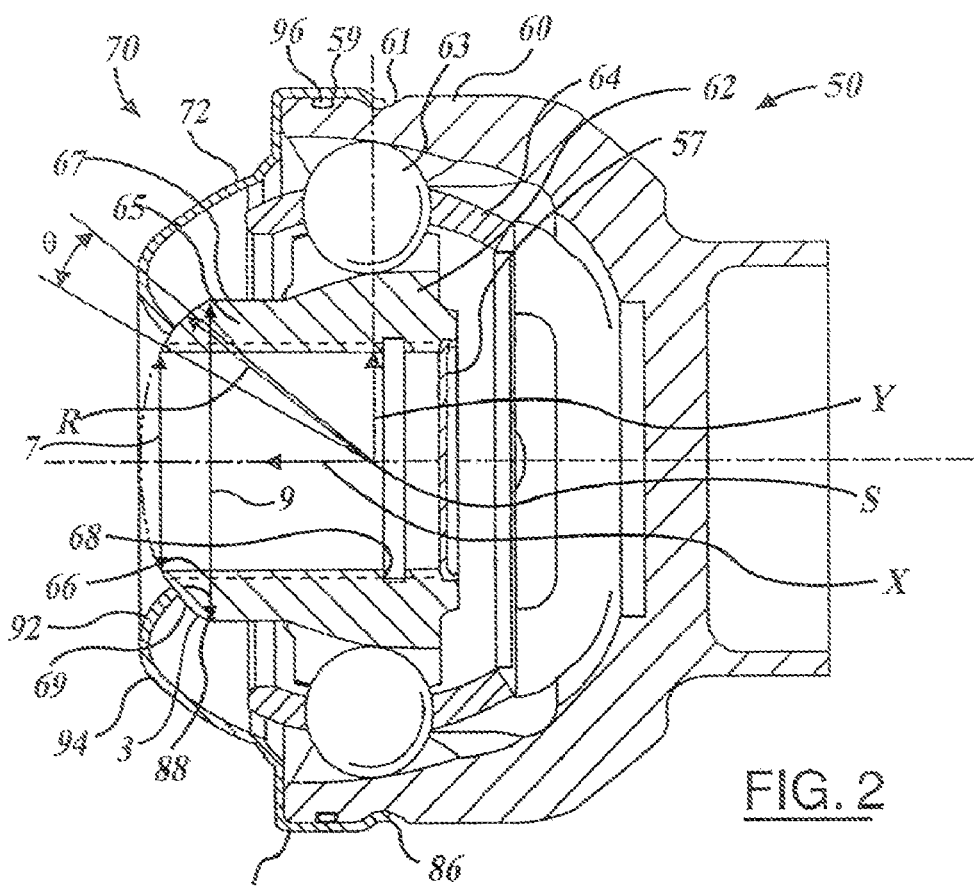
FIG. 2 shows a cross-sectional view of a grease shield sealing system of the present invention.
Figure 3:
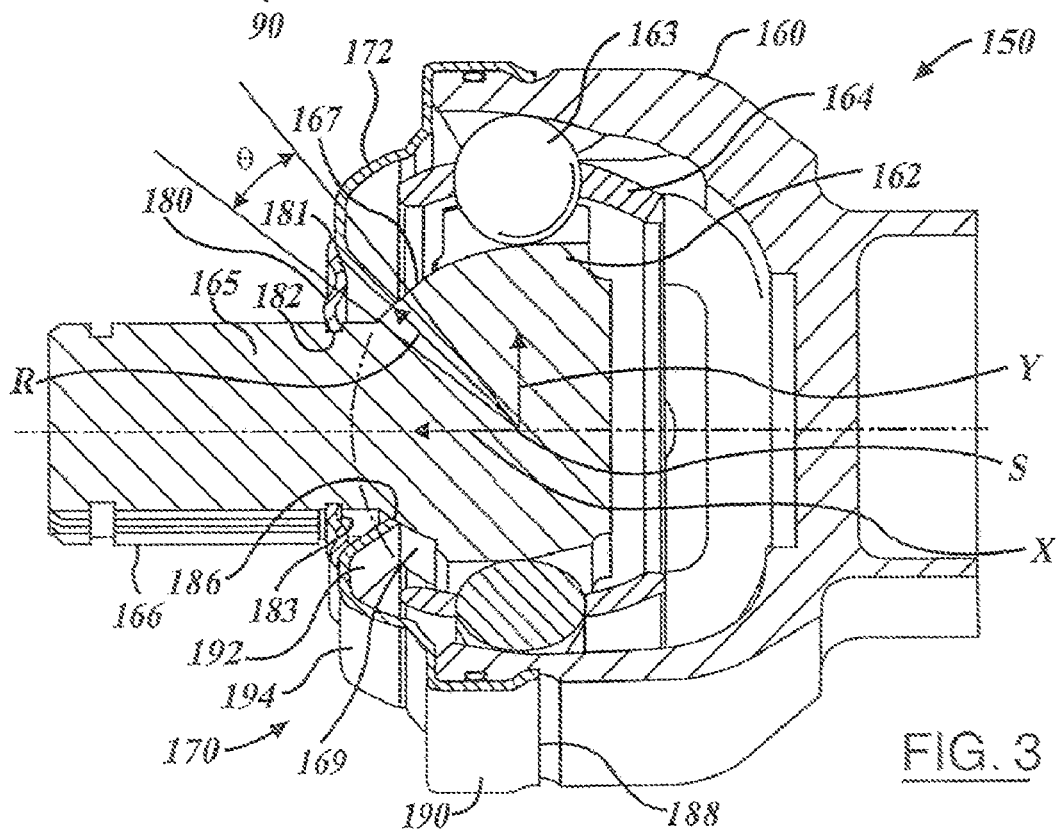
FIG. 3 shows a second cross-sectional view of a grease shield sealing system of the present invention.

For completeness of the description of the first and second embodiments of the present invention as given in FIGS. 2, and 3, respectively, the term direct torque flow (DTF) connection refers to a connection from the inner race of a constant velocity joint (CVJ) to the shaft of a differential, transmission or transfer case, generally supplied by the customer. The connection typically is in the form of a spline because of its robust design features. However, it is anticipated that other forms of connection are appropriate including fixed and releaseable connections between the inner race and the shaft. A mating key connection is just one example, without limitation, of a releaseable connector between the inner race and the shaft. Thus, a DTF connection refers to the inner race coupling to the shaft of a drive unit, such as a differential, transmission or transfer case without limitation, as opposed to the traditional connection mentioned above. The connection type may be divided into two styles of DTF connection types, I.e. direct or indirect, as described in United States Patent Application Publication No.: US 2007-0123357 A1, incorporated by reference herein. The DTF direct connection utilizes an extension shaft on the inner joint part to provide a male connection to a drive unit, such as shown in FIG. 3. Whereas, the DTF indirect connection utilizes a female coupling on the inner joint part to provide a female connection to a shaft of a drive unit, such as shown in FIG. 2.

Also, as used herein, a DTF connector refers to a joint coupled to a shaft which forms a DTF shaft assembly. Only together with the shaft of a differential, for example, does a DTF connector combine to make a DTF connection. It is recognized that the shaft of the drive unit may include the shaft of any input or output drive unit and is not necessarily limited to a shaft of a differential, transmission or transfer case.

FIGS. 2 and 3 will initially be described jointly below to the extent that their details generally correspond to one another. However, each of the constant velocity joints given in the various embodiments of the invention may have additional or different features recognized by a person of skill in the art. FIGS. 2 and 3 each show a DTF CVJ 50, 150, respectively, for connection. Generally, each DTF CVJ 50, 150 includes an outer joint part 60, 160, an inner joint part 62, 162 having an interface or outer surface 67, 167 having a semi-spherical portion 69, 169, torque transmitting balls 63, 163, and a ball cage 64, 164, respectively. The balls 63, 163 are held in windows within the ball cage 64, 164, respectively. Also, each DTF CVJ 50, 150 may include an inventive grease shield sealing system 70, 170, respectively, to be described below. Before turning to the discussion of each inventive grease shield sealing system, the representative DTF CVJ 50 given in FIG. 2 is first discussed.

The outer joint part 60 generally has a circumferential-shaped or semi-spherical bore therein and an outer surface. The outer joint part 60 is generally made of a steel material, however, it should be noted that any other type of metal material, hard ceramic, plastic, or composite material, etc. may also be used for the outer joint part 60. The material is required to be able to withstand the high speeds, temperatures and contact pressures required for the DTF CVJ 50. The outer joint part 60 also includes a plurality of axially opposed outer ball tracks located on an inner surface thereof. The tracks generally form a spherical-shaped path within the inner surface of the outer joint part 60. The tracks are axially opposed such that one half of the ball tracks open to a side of the outer joint part 60 opposite to that of the other half of the ball tracks in any number of patterns. Optionally, for different types of DTF CVJs, the ball tracks all may open or axially align on the same side of the outer race. Also, the ball tracks may be of a gothic or elliptical shape provided the pressure angle and conformity are maintained, or may be other shapes, as is understood by a person having skill in the art. Moreover, the ball tracks on the inner surface of the outer joint part 60 may also be double offset tracks. It should be noted that in the first embodiment as shown in FIG. 2 is a four plus four constant velocity joint, which has a total of eight balls in the DTF CVJ 50. While the DTF CVJ 50 first embodiment is an indirect DTF CVJ having a fixed arrangement, any DTF constant velocity joint type consistent with the present invention may be utilized. Specifically, the DTF CVJ 50 of the present invention is a fixed style of constant velocity joint, and is not particularly suited for constant velocity joints having a plunging feature. Further, it should be noted that it is also contemplated that a joint may be made having any number of balls incorporating all of the features of the DTF CVJ 50 according to the present invention including six, ten or more balls.

The inner joint part 62 of the present embodiment generally has a circumferential shape. The inner joint part 62 is arranged within a cavity of the outer joint part 60. The inner joint parts 62 includes an extension 65 and an inner bore 66 that is splined for transmitting torque from the DTF CVJ in a rotationally fast way to a supplied toothed or splined portion of a shaft (not shown). Torque transmission of the inner joint part 62 with a supplied shaft may be accomplished in other ways as would be recognized by a person of skill in the art. Axial retention of the inner joint part 62 with a supplied shaft is by way of a circlip (not shown) retention in a retention groove 68. It is also recognized that axial retention of the inner joint part 62 with a supplied shaft may also be accomplished by a compression nut, collet connector, a spring clip, or a threaded fastener just to name a few examples, without limitation. An attachment or outer surface 67 of the inner joint part 62 includes a plurality of inner ball tracks that are axially opposed. The ball tracks generally have a spherical shape and are aligned with the ball tracks on the outer joint part 60 such that the axial angle will open in a similar or the same direction as the outer ball track directly aligned above it on the outer joint part 60. The inner ball tracks on the outer spherical surface of the inner joint part 62 have one half of the ball tracks axially oriented in one way while the other half of the ball tracks are axially oriented in the opposite direction. The inner ball tracks will open in an alternating pattern around the outer circumference of the inner joint part 62 in a matching relationship to that of the outer ball tracks of the outer joint part 60. It should be noted that in this embodiment the inner joint part 62 is made of steel, however, any other metal composite, hard plastic, ceramic, etc. may also be used.

The interface or outer surface 67 of the inner joint part 62 includes a semi-spherical portion 69. The semi-spherical portion 69 is radially located on the outer axial side of the inner ball tracks formed on the inner joint part 62. The semi-spherical portion 69 is defined over an annularly extending arc θ having a substantially constant radius R that extends from an center S located at the intersection of the constant velocity joint's 50 radial center axis Y and the inner joint part's 62 axial center axis X. The radial center axis Y lies to the within a constant velocity plane. The semi-spherical portion 69 receives a can or shield (described below) that extends from the outer joint part 62, thereby maintaining the sealed environment within the DTF CVJ 50 while allowing a drive unit to be connected to the inner joint part 62. Also, while the semi-spherical portion 69 is describe in terms of its geometric feature, it is to be understood that the semi-spherical portion could be alternatively described as the outer surface area 3 bounded between a smaller circle 7 and a larger circle 9 located within one hemisphere of a sphere having a center coinciding with the geometric constant velocity joint center.

The ball cage 64 generally has a ring-like appearance. The ball cage 64 is arranged within the bore of the outer joint part 60 such that it is not, in this embodiment, in contact with the inner surface of the outer joint part 60. The cage 64 has a plurality of windows through a surface thereof. The number of windows may match the number of ball tracks on the outer joint part 60 and inner joint part 62 of the DTF CVJ 50, which is eight windows therethrough in the present embodiment of the invention. The number of balls and windows may, however, differ. The cage 64 along with the plurality of balls 63 are preferably made of a steel material but any other hard metal material, plastic, composite or ceramic, etc. may also be used.

The DTF CVJ 50 includes a plurality of balls 63. The balls 63 are each arranged within windows of the cage 64 and within a ball track of the outer joint part 60 and of the inner joint part 62, respectively. More than one ball may be arranged within each of the windows or there may be no balls within a window. The balls 63 roll in axially opposed inner and outer ball tracks.

The DTF CVJ 50 may include a grease cap or barrier 57. The barrier 57 is generally made of a metal material, however, any plastic, rubber, ceramic or composite material may also be used. The barrier is press fit or integrally constructed between the inner joint part 62 and a supplied shaft, such that the inner bore 66 is sealed from the cavity of the DTF CVJ 50. However, any other securing method known may also be used such as fasteners, bonding, etc. The barrier will insure the grease, which is used as a lubricant, will remain within the DTF CVJ 50.

While the first embodiment of the invention is described for a particular DTF CVJ having balls and sets of ball tracks for a particular type of constant velocity joint motion, it is recognized that any other suitable constant velocity balls and sets of ball tracks may be utilized with the current invention. Moreover, the DTF CVJ is substantially a fixed type of joint as is recognized within the art. Because CVJ's are well understood to a person of skill in the art, the DTF CVJ as given in the second embodiment is discussed below only to the extent necessary to further describe the invention.

FIG. 2 shows a cross-sectional view of a first embodiment of an inventive grease shield sealing system 70 being used with a DTF CVJ 50. The grease shield sealing system 70 includes the outer joint part 60, the inner joint part 62 having a semi-spherical portion 69, and a can or shield 72 having a first end 86 and a second end 88. The first end 86 of the shield 72 is connected to the outer joint part 60 such that the second end 88 of the shield 72 is in abutting relationship with the semi-spherical portion 69 of the inner joint part 62, thereby providing a protective barrier for the internal parts and lubrication retention within the DTF CVJ 50. The shield 72 is generally annular or semi-torrus shaped, such that the second end 88 is annularly located about the axial centerline of the DTF CVJ 50. The shield 72 includes a compression or first portion 90 and an engagement or second portion 92 separated by a spring-like or third portion 94 in the form of an axially inverted aperture.

The first portion 90 is for annularly securing and sealingly connecting the shield 72 to the outer joint part 60. The first portion 90 is crimped within a circumferential channel 61 located on the exterior of the outer joint part 60 of the DTF CVJ 50. Additionally, an o-ring or seal 96 may be provided in a second circumferential channel 59 located on the exterior of the outer joint part 60, thereby compressively sealing the first portion 90 of the shield 72 to the outer joint part 60. The first portion 90 of the shield 72 includes several bends that facilitate tight engagement with the outer joint part 60 and reduces the envelope or cylindrical size of the shield 72 toward the third portion 94. Moreover, the first portion 90 may have any shape consistent with the present invention, including a cross-sectional profile that reduces the total internal cavity volume of the DTF CVJ 50. While the first portion 90 of the shield is crimped to the outer joint part 60 in this embodiment, it is recognized that the shield may be fastened by adhesive, rivets, bolts or any suitable fastener, without limitation, and may also include additional seals or flange gaskets to help seal at the fastening interface.

The second portion 92 is hook-like such that the second end 88 faces generally in the same axial direction as the first end 86. Generally, the aperture-like second end 88 provides abutting and sealing contact with the semi-spherical portion 69 of the inner joint part 62 when the DTF CVJ 50 is rotated about its center line X or at an angular offset.

The third portion 94 provides support for the second portion 92. Generally, the third portion 94 provides for resilient transition for the second portion 92 such that the second end 88 will stay in abutting contact with the semi-spherical portion 69 of the inner joint part 62. Optionally, as shown in this embodiment, the third portion 94 may further reduce the cylindrical size of the shield 72 between the first portion 90 and the second portion 92. It is recognized that while the third portion 94 and the second portion 92 have been describe separately, they may be considered as one portion.

Optionally, the second portion 92 about the second end 88 of the shield 72 may include an annular molded-on wiper seal (not shown). A wiper seal will facilitate lubrication retention within the DTF CVJ at the abutting contact location between the second end 88 of the shield 72 and the semi-spherical portion 69 of the inner joint part 62.

While the shield 72 has been described as a single material piece, it may be formed from multiple material pieces, thereby facilitating the attributes indicated above for each portion 90, 92 or 94. The shield 72 may be made from metal or other materials, including plastic, for example, that have a rigid or semi-rigid quality when used as a substantially cylindrical shape while providing the sealing attributes desired at the first portion 90 and at the second end 88.

FIG. 3 shows a cross-sectional view of a second embodiment of an inventive grease shield sealing system 170 being used with a DTF CVJ 150. The DTF CVJ 150 is a direct connector type that includes male splines 166 located on an extension 165 of an inner joint part 162. The grease shield sealing system 170 includes the outer joint part 160, the inner joint part 162 having a semi-spherical portion 169, and a can or shield 172 having a first end 186 and a second end 188. The first end 186 of the shield 172 is connected to the outer joint part 160 such that the second end 188 of the shield 172 is in abutting relationship with the semi-spherical portion 169 of the inner joint part 162, thereby providing a protective barrier for the internal parts and lubrication retention within the DTF CVJ 150. The shield 172 is generally annular or semi-toroidal shaped, allowing the second end 188 to be annularly located about the axial centerline of the outer joint part 160. The shield 172 includes a connection or first portion 190 and an engagement or second portion 192 separated by a third portion 194. The grease shield sealing system 170 also includes a membrane seal 180 having an outer periphery 181 and an inner periphery 182.

The outer periphery 181 of the membrane seal 180 is attached to the shield 172 generally between the second portion 192 and the third portion 194. The inner periphery 182 of the membrane seal 180 is received in a membrane channel 183 located between the male splines 166 and the semi-spherical portion 169 of the inner joint part 162. The membrane seal 180 includes convolutes such that the membrane seal 180 will provide secondary sealing for the grease shield sealing system 170 when the DTF CVJ 150 undergoes angular and cyclic gyrations during operation, while primary sealing will occur between the second end 188 of the shield 172 and the semi-spherical portion 169 of the inner joint part 162. It is recognized that the outer periphery 181 of the membrane seal 180 may be attached to the shield 172 in any appropriate location. Also, the inner periphery 182 of the membrane seal 180 may be attached to the inner joint part 162 in an appropriate location consistent with the present invention. Attachment of the membrane seal 180 to the shield 172 may be by gluing, crimping or fixing without limitation. Attachment of the membrane seal 180 to the inner joint part 162 may be by resilient retention of the material used for the membrane seal 180, by clamping or by other suitable attachment methods consistent with the present invention.

The membrane seal 180 may comprise any suitable material that is sufficiently flexible to allow the DTF CVJ 150 to operate through a range of angles without interfering with the primary seal created by the shield 172 and the inner joint part 162. Suitable materials include thermoplastic, HNBR (Hydrogenated Nitrile Butadiene Rubber), rubber, silicone, plastic and urethane, etc. Advantageously, HNBR, TPV, rubber and silicone also provide good sealing properties for an optional molded-on wiper seal (not shown). Other material suitable for the present invention may be used as would be recognized by a person of skill in the art.

While the material, coupling and treatment of some of the CVJ parts have been discussed, appropriate selection for other parts would be well understood by a person of skill in the art.

While the present invention has been described for a DTF CVJ, it is also recognized that the present invention may be used on a non-plunging constant velocity joint.

From the foregoing, it can be seen that there has been brought to the art a new and improved grease shield sealing system for a DTF CVJ. While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:

1. A grease shield sealing system for a direct torque flow constant velocity joint comprising:
    an inner joint part having an outer surface, said outer surface having a semi-spherical portion toward an axial open end of the direct torque flow constant velocity joint, said semispherical portion radially located on an outer axial side of inner ball tracks formed on said inner joint part;
    an outer joint part having an external surface and rotationally coupled to said inner joint part;
    a shield extending between a first end and a second end, said first end axially retained on said external surface of said outer joint part, and said second end in abutting contact with said semi-spherical portion of said inner joint part such that said second end seals a fluid within the constant velocity joint; and
    a resilient portion included with said shield and located between said first end and said second end, where said resilient portion provides spring-like abutment against said shield such that said second end of said shield seals said fluid within said constant velocity joint.

2. The grease shield sealing system of claim 1 wherein said shield is made from metal.

3. The grease shield sealing system of claim 1 wherein said shield is semi-torrus shaped.

4. The grease shield sealing system of claim 1 wherein said second end is an orifice annularly located about an axial centerline of the outer joint part.

5. The grease shield sealing system of claim 1 wherein said shield includes a first portion and a second portion separated from said first portion by the resilient portion, wherein said resilient portion radially transitions between said first portion and said second portion.

6. The grease shield sealing system of claim 5 further comprising a membrane seal having an outer periphery and an inner periphery, wherein said outer periphery is radially coupled to said resilient portion and said inner periphery is coupled to said inner joint part providing secondary sealing.

7. The grease shield sealing system of claim 6 wherein said membrane seal is made from Hydrogenated Nitrile Butadiene Rubber.

8. The grease shield sealing system of claim 1 wherein said semi-spherical portion of said inner joint part is an annularly extending arc having a substantially constant radius.

9. The grease shield sealing system of claim 8 wherein said radius extends from an origin located at the intersection of a radial center axis of the constant velocity joint and an axial center axis of said inner joint part.

10. The grease shield sealing system of claim 1 wherein said inner joint part further comprises an inner bore axially concentric within said semi-spherical portion and adapted to engage a shaft of a drive unit providing a DTF CVJ indirect connection.

11. The grease shield sealing system of claim 1 further comprising an o-ring located in a circumferential channel in said outer joint part and compressed by said first end of said shield.

12. A grease shield sealing system for direct torque flow constant velocity joint comprising:
    an inner joint part having a semi-spherical portion toward an axial open end of the direct torque flow constant velocity joint;
    an outer joint part having an external surface and rotationally coupled to said inner joint part, the outer and inner joint parts defining a cavity;
    a semi-rigid shield having a first portion, a second portion, and a third portion, said first portion axially retained on said external surface of said outer joint part, said second portion in abutting contact with said semi-spherical portion of said inner joint part, and said third portion delineating a transition between said first portion and said second portion; and
    a membrane seal having an outer periphery and an inner periphery, wherein said outer periphery is radially coupled to said third portion and said inner periphery is coupled to said inner joint part to provide secondary sealing,
    wherein said semi-spherical portion is defined by an outer surface area of said inner joint part that is bounded between a smaller circle cross-section and a larger circle cross-section of a sphere, said smaller circle cross-section and said larger circle cross-section being axially separated and located within one hemisphere of a sphere having a center coinciding with a geometric center of the direct torque flow constant velocity joint;
    wherein said third portion that is included with said shield provides spring-like abutment against said shield such that the second portion of the shield seals fluid within the direct torque flow constant velocity joint.

\* \* \* \* \*